United States Patent [19]

Miller

[11] Patent Number: 5,348,515

[45] Date of Patent: Sep. 20, 1994

[54] SPROCKET WEAR INDICATOR

[75] Inventor: Larry E. Miller, Wausau, Wis.

[73] Assignee: Case Corporation, Racine, Wis.

[21] Appl. No.: 3,742

[22] Filed: Jan. 13, 1993

[51] Int. Cl.⁵ ............................................ F16H 55/30
[52] U.S. Cl. ..................................... 474/152; 474/901
[58] Field of Search ............... 474/152, 158, 160, 901

[56] References Cited

U.S. PATENT DOCUMENTS

| | | | |
|---|---|---|---|
| 2,731,730 | 1/1956 | Kraushaar | 33/199 |
| 3,193,936 | 7/1965 | Schnitzer | 33/168 |
| 3,603,650 | 9/1971 | Miller | 474/901 X |
| 3,606,497 | 9/1971 | Gilles | 474/901 X |
| 3,805,761 | 4/1974 | Kotthaus | 125/11 PH |
| 3,907,382 | 9/1975 | Kessinger, Jr. | 305/10 |
| 3,960,412 | 6/1976 | Shuler | 305/57 |
| 4,059,022 | 11/1977 | Fawcett et al. | 474/131 |
| 4,185,391 | 1/1980 | Roley | 33/501.7 |
| 4,276,040 | 6/1981 | Petershack | 474/229 |
| 4,443,041 | 4/1984 | Wohlford | 305/43 |
| 4,487,088 | 12/1984 | Olson | 474/152 X |
| 4,776,826 | 10/1988 | Scott | 474/156 |
| 5,144,762 | 9/1992 | Robinson | 37/141 T |

Primary Examiner—Ramon S. Britts
Assistant Examiner—Roger J. Schoeppel
Attorney, Agent, or Firm—Rudnick & Wolfe

[57] ABSTRACT

A wear indicator for a sprocket adapted to have an endless track arranged in driving association therewith. The sprocket has opposite side surfaces and a series of sprocket teeth disposed peripherally about the sprocket. Each sprocket tooth has a tip with track engaging surfaces extending away therefrom to define a tooth profile. The sprocket wear indicator includes a visual marker on a side surface of the sprocket for allowing a person to visually gauge wear of the tooth profile on the sprocket.

9 Claims, 1 Drawing Sheet

SPROCKET WEAR INDICATOR

FIELD OF THE INVENTION

The present invention generally relates to sprockets for track laying implements and, more particularly, to a sprocket that embodies a wear indicator for gauging sprocket tooth wear.

BACKGROUND OF THE INVENTION

A sprocket of a track laying implement is rotatably driven in opposite rotational directions and includes a plurality of teeth which engage an endless track chain including trackpins and bushings articulately interconnecting like track sections. Each sprocket tooth has a predetermined initial profile defined by a tip with opposite track engaging surfaces extending therefrom and toward a tooth root.

Wear on the sprocket teeth results from contact with the track chain as well as the abrasiveness of dirt, rocks, and other debris material entrapped or packed therebetween. More specifically, sliding vertical contact with the track bushings during forward and reverse directional movements of the track chain causes wearing of the tooth root. Sliding contact with the track bushings likewise causes wear on reverse and forward sides of each sprocket tooth. Uneven terrain and side hills, turning of the implement, improper width of track link shoes, and the like, furthermore causes sprocket tooth corners to wear.

When the wear pattern remains within the side surfaces of the tooth, the sprocket remains usable. When the wear pattern, however, extends into the tip of the tooth, positive engagement of the sprocket teeth into the track chain is adversely effected, and the track chain may jump over the teeth. This causes extreme shock loads which could damage the track components. Accordingly, excessive wear of the sprocket tooth profile normally requires replacement of the sprocket.

Different forms of gauges have been heretofore utilized for attempting to determine whether the sprocket remains usable or has been worn to an extent requiring replacement. Such gauges have normally required accurate and proper placement between the sprocket teeth to measure wear as a function of the gap between the gauge and the sprocket teeth. Besides the problem of accessibility to gauge sprocket tooth wear, such gauges are not reliable as a means of measuring sprocket wear because the sprocket teeth have no clear reference point from which to take a measurement. Thus, such gauges normally result in a misreading of the actual extent of wear of the sprocket.

Thus, there remains a need and a desire for a sprocket wear indicator which does not rely on proper placement of a gauge between adjacent teeth of the sprocket and yet which provides an accurate measurement of sprocket wear.

DESCRIPTION OF THE PRESENT INVENTION

In view of the above, and in accordance with the present invention, there is provided a sprocket wear indicator which accurately provides a visual indication of when the sprocket should be replaced. The sprocket with which the present invention is utilized is adapted to have an endless track entrained thereabout and in driving relationship therewith. As is conventional, the sprocket includes opposite side surfaces and a series of sprocket teeth disposed peripherally thereabout. Each sprocket tooth has a tip with track contacting surfaces extending between the tips of adjacent sprocket teeth to define a tooth profile for the sprocket. The wear indicator of the present invention is provided on a side surface of the sprocket and is disposed a predetermined distance inwardly from the original or relatively wornless tooth profile of at least one sprocket tooth for allowing the person to visually gauge wear of the track contacting surfaces of the tooth sprocket.

The wear indicator can take many forms. With the present invention, the wear indicator includes a marker or formation on the side surface of the sprocket. The marker formation is initially spaced inwardly a predetermined distance from a wornless track contacting surface of at least one sprocket tooth.

In a preferred form of the invention, the visual marker or indicator comprises an inwardly directed groove or recess on the side surface of the sprocket and which is formed integral with fabrication of the sprocket. In a most preferred form of the invention, the visual marker comprises a continuous groove extending about the side face of the sprocket and generally paralleling a wornless tooth profile on the sprocket.

The present invention advantageously allows sprocket wear to be readily visible without requiring any special gauges or measuring equipment. Albeit extremely simple in design and manufacture, the wear indicator is highly effective. Providing the wear indicator as a marker which is integrally formed with the sprocket ensures that the indicator will not be worn off when contacting sides of the endless track.

Numerous other features and advantages of the present invention will become readily apparent from the following detailed description, the accompanying drawings, and the appended claims.

DETAILED DESCRIPTION OF THE PREFERRED EMBODIMENT

Figure 1:
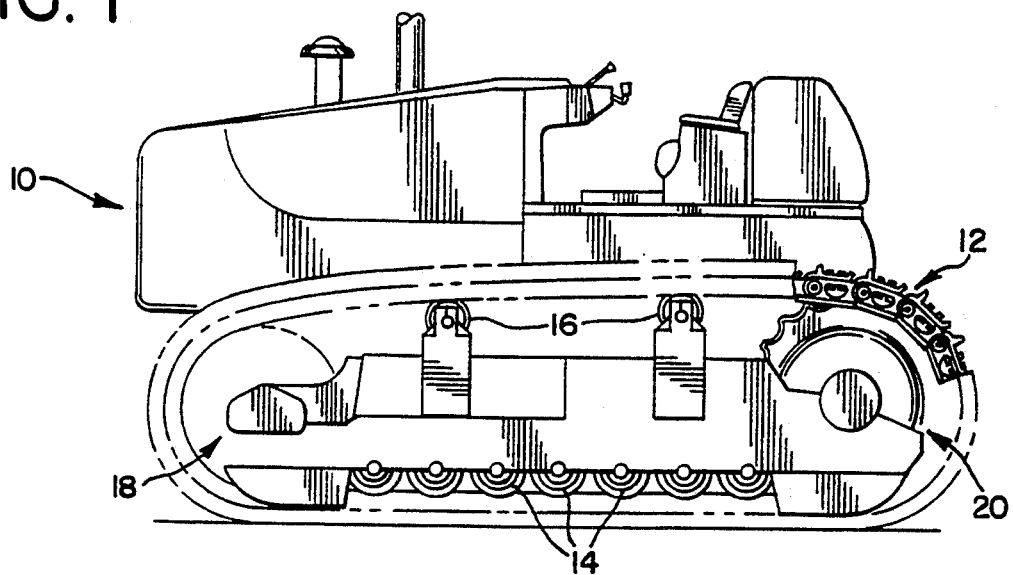
FIG. 1 is a side elevational view of a track-laying implement.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals refer to like parts throughout the several views, there is schematically illustrated in FIG. 1 a track-laying implement generally designated by reference numeral 10. The implement 10 is mounted in a conventional manner on a pair of endless tracks 12. The tracks 12 are trained about a pair of plurality of support and carrier rollers 14 and 16, respectively, an idler wheel 18, and a toothed sprocket 20, which makes up a crawler drive system.

Figure 2:
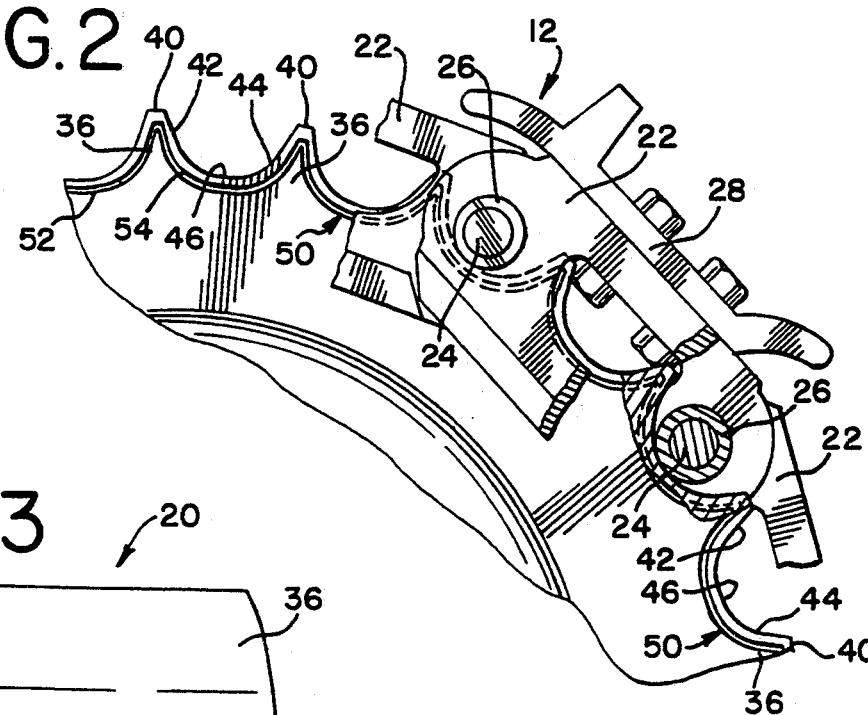
FIG. 2 is a fragmentary and enlarged side elevational view of a sprocket of the implement illustrated in driving engagement with an endless track.

As shown in FIG. 2, each endless track 12 comprises a plurality of like sections 22 which are articulately interconnected to each other by trackpins 24 and bushings 26. A plurality of track shoes 28 are secured in a suitable manner, as by bolting, or the like, to the sections 22 to define an endless crawler track.

Figure 3:
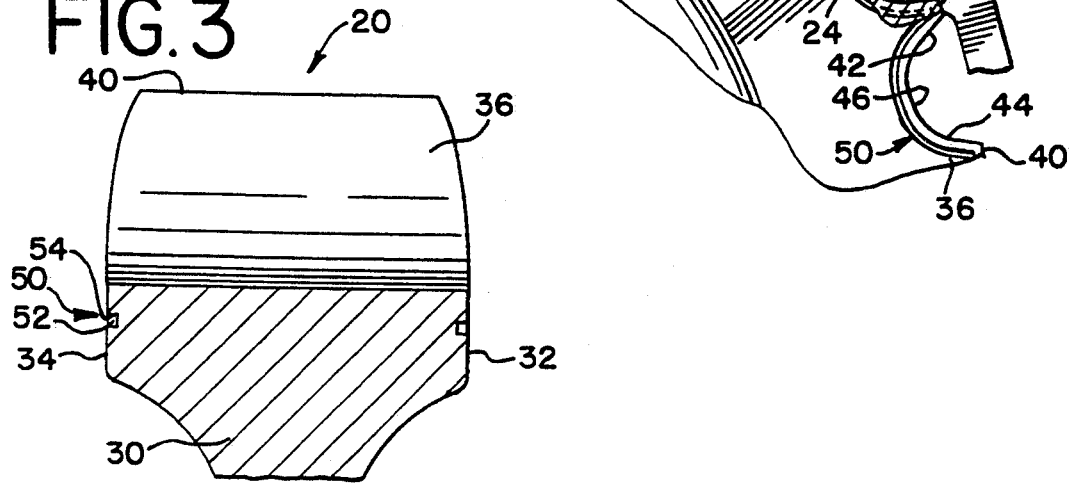
FIG. 3 is a fragmentary section view taken along line 3—3 of FIG. 2.

As shown in FIG. 3, sprocket 20 includes a body 30 having an axis of rotation. Sprocket 20 further includes a first side surface 32 which faces inwardly toward the implement 10 and a second side surface 34 which faces outwardly from the implement and is readily visible to a person standing alongside the implement 10. As seen in FIGS. 2 and 3, sprocket 20 further includes a plurality of teeth 36 arranged about an outer peripheral surface of the sprocket between the side surfaces 32 and 34. As is conventional, the sprocket teeth 36 are disposed peripherally about the sprocket in equally spaced relation about the axis of rotation of body 30.

The sprocket teeth 36 each include a tooth tip 40. Connecting the tips 40 of adjacent teeth 36 are adjacent flanks or surfaces 42 and 44 extending radially from the tip 40 and which are joined by a root area 46 to define a tooth profile. During implement operation, the bushings 26 of the endless track 12 seat in and contact such flanks 42, 44 and root area 46 and provide wear thereof over a period of operation of the implement.

A salient feature of the present invention concerns the provision of a sprocket wear indicator 50 on at least the outer side surface 34 of sprocket 20 for indicating wear of the sprocket teeth 36. Notably, all the sprocket teeth 36 should have a similar wear pattern when running on the same implement. Accordingly, wear indicator 50 can reflect the wear of a single sprocket tooth profile or more than one sprocket tooth profile.

The sprocket wear indicator 50 comprises a visual marker 52. The visual marker 52 can take a myriad of forms, but preferably is in the form of an inwardly directed groove 54. Preferably, marker 52 is formed integral with fabrication of the sprocket 20. The marker 52 extends generally parallel to and is spaced inwardly at a predetermined distance from the tooth profile of a wornless sprocket. The term "wornless sprocket" is meant to denote a sprocket having substantially no tooth wear thereon.

To facilitate evaluation of sprocket wear, marker 52 preferably extends in an annular fashion on the outer side surface 34 of sprocket 20 and generally parallels the profile of each sprocket tooth 36.

When the teeth 36 of sprocket 20 are worn to the point that the tooth profile proximates the wear indicator 50, the user is alerted to the fact that replacement of the sprocket 20 is necessary. For a 25-tooth sprocket having an original or wornless outside diameter (distance between diametrically opposed tip portions) which measures approximately 651 centimeters and a root circle measuring approximately 588 centimeters, the predetermined distance separating marker 52 from a wornless tooth profile should be approximately five centimeters. It should be appreciated, however, that sprockets having different configurations may require the marker to be displaced at a different distance from the profile to provide an adequate visual indication of sprocket wear.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A sprocket comprised of a body with opposite side surfaces and a series of equally spaced teeth about an outer surface thereof between the side surfaces, each tooth comprising a tip with opposite flanks extending radially from said tip toward a root to define a tooth profile, and an indicator provided on at least one of said side surfaces at a predetermined distance from a relatively wornless tooth profile of least one of said sprocket teeth to provide a visual indication of wear of the sprocket teeth.

2. The sprocket according to claim 1 where said indicator is formed as a recess on the side surface of said body and generally parallels the relatively wornless tooth profile on the sprocket.

3. A sprocket for an implement with an endless track adapted for driving association with said sprocket, said sprocket having an axis of rotation, opposite side surfaces, and a series of teeth disposed peripherally about said sprocket in equally spaced relation about said axis of rotation, each sprocket tooth having a tip and track contacting surfaces extending between tips of adjacent sprocket teeth, said sprocket further including a visual marker on a side surface of said sprocket for allowing a person to visually gauge wear of the track contacting surfaces of the toothed sprocket.

4. The sprocket according to claim 3 wherein said visual marker includes a formation on the side surface of the sprocket, said marker formation being initially spaced inwardly a predetermined distance from a wornless track contacting surface of at least one sprocket tooth.

5. The sprocket according to claim 3 wherein said visual marker includes an annular formation on the side surface of the sprocket, said annular formation being initially spaced inwardly a predetermined distance from and generally parallels wornless track contacting surfaces extending about the sprocket.

6. The sprocket according to claim 3 wherein said visual marker includes a formation on the side surface of the sprocket, said marker formation being initially spaced inwardly a predetermined distance from a wornless track contacting surface of at least one sprocket tooth.

7. A sprocket for an implement with an endless track entrained in driving engagement with said sprocket, said endless track including a plurality of like sections articulately interconnected to each other by trackpins and bushings, said sprocket having opposite side faces and circumferentially adjacent teeth arranged to engage said bushings of said track whereby driving the track, each sprocket tooth having a tip with track engaging surfaces extending away therefrom to define a tooth profile, and wherein said sprocket further includes a wear indicator on a side surface thereof for visually indicating sprocket tooth wear, said wear indicator including a visual marker disposed a predetermined distance inwardly from the tooth profile of at least one sprocket tooth to indicate that replacement of the sprocket is required when the tooth profile is worn proximate to the marker.

8. The sprocket according to claim 7 wherein said visual marker comprises a continuous groove extending about the side face of the sprocket and that generally parallels a wornless tooth profile on the sprocket.

9. The sprocket according to claim 7 wherein said visual marker includes a formation extending at least partially about the side surface of the sprocket.

* * * * *